US005657689A

United States Patent [19]

Lee

[11] Patent Number: 5,657,689

[45] Date of Patent: Aug. 19, 1997

[54] FRANKING MACHINE SYSTEM

[75] Inventor: Daniel John Lee, Warley, United Kingdom

[73] Assignee: Neopost Limited, Essex, United Kingdom

[21] Appl. No.: 575,325

[22] Filed: Dec. 20, 1995

[30] Foreign Application Priority Data

Jan. 4, 1995 [GB] United Kingdom .................... 9500074

[51] Int. Cl.[6] ............................ B41L 47/56; G06F 17/00

[52] U.S. Cl. ............................................ 101/91; 364/464.2

[58] Field of Search ......................... 101/91; 364/404.02; 395/186; 235/375, 380, 381

[56] References Cited

U.S. PATENT DOCUMENTS

| | | | |
|---|---|---|---|
| 4,933,849 | 6/1990 | Connell et al. | 364/400 |
| 4,987,406 | 1/1991 | Reid | 340/539 |
| 5,202,834 | 4/1993 | Gilham | 364/464.02 |

FOREIGN PATENT DOCUMENTS

| | | |
|---|---|---|
| 0376574 | 7/1990 | European Pat. Off. . |
| 1580416 | 12/1980 | United Kingdom . |

OTHER PUBLICATIONS

European Patent Application, Great Britian, Application No.: 95300564.2 Aug. 1995.

*Primary Examiner*—Stephen R. Funk
*Assistant Examiner*—Dave A. Ghatt
*Attorney, Agent, or Firm*—Shoemaker and Mattare, Ltd.

[57] ABSTRACT

A franking machine system is disclosed in which a signal is transmitted for reception only in a predetermined location. A franking machine intended to be operated at the predetermined location is inoperative to carry out franking operations unless it receives the signal transmitted to the predetermined location. Accordingly a franking machine intended for operation at the predetermined location cannot be operated for franking mail if it is moved away from that location.

13 Claims, 1 Drawing Sheet

FRANKING MACHINE SYSTEM

BACKGROUND OF THE INVENTION

This invention relates to franking machines and in particular relates to controlling use of such machines.

Franking machines are utilised to frank items of mail by printing on the mail item a franking impression indicating that a postage charge for the item has been accounted for. Often franking machines operate in a pre-payment mode in which a value of credit is stored in a register of the franking machine and as a part of each operation to frank an item, the credit value is decremented by an amount equal to a postage charge for the item. Other registers of the franking machines are usually provided to maintain for example a total value of postage charge dispensed by the franking machine, the number of items franked and the number of items franked with a postage charge greater than a predetermined value.

When permitted by a postal authority, franking machines may be operated in a post-payment mode. In a post payment mode of operation the franking machine maintains an account of postage value used in franking mail items with postage charges and periodically the accounting data in the registers of the franking machine is provided to the postal authority and the user is billed in accordance with the accounting data for postage value used in the preceding time period. In order to ensure that the postal authority receives payments at substantially regular intervals for postage value used, the franking machine may be caused to lock at predetermined time periods or upon completion of a predetermined number of franking cycles.

Use of a franking machine by a user is licensed by the appropriate postal authority under conditions determined by the postal authority. These conditions usually include inter alia that the franking machine will be used only at a specifically authorised location. However since franking machines are relatively small machines they are relatively easily transported and may be removed from the authorised location to be used at another unauthorised location where attempts may be made to operate the franking machine in a fraudulent manner.

SUMMARY OF THE INVENTION

According to the invention a franking machine system includes a franking machine for carrying out printing of franking impressions indicating postage charge on mail items; said franking including machine electronic means for carrying out accounting functions to account for postage charge and for carrying out control functions of the franking machine; and receiving means operative to receive a wireless signal; and the franking machine system further includes transmission means to transmit a predetermined signal; said electronic means of the franking machine being operative in response to receipt of said predetermined signal by the receiving means to carry out a franking operation to frank a mail item and being inoperative to carry out a franking operation when the predetermined signal is not received.

BRIEF DESCRIPTION OF THE DRAWING

An embodiment of the invention will be described hereinafter with reference by way of example to the drawings in which.

DESCRIPTION OF THE PREFERRED EMBODIMENT

Figure 1:
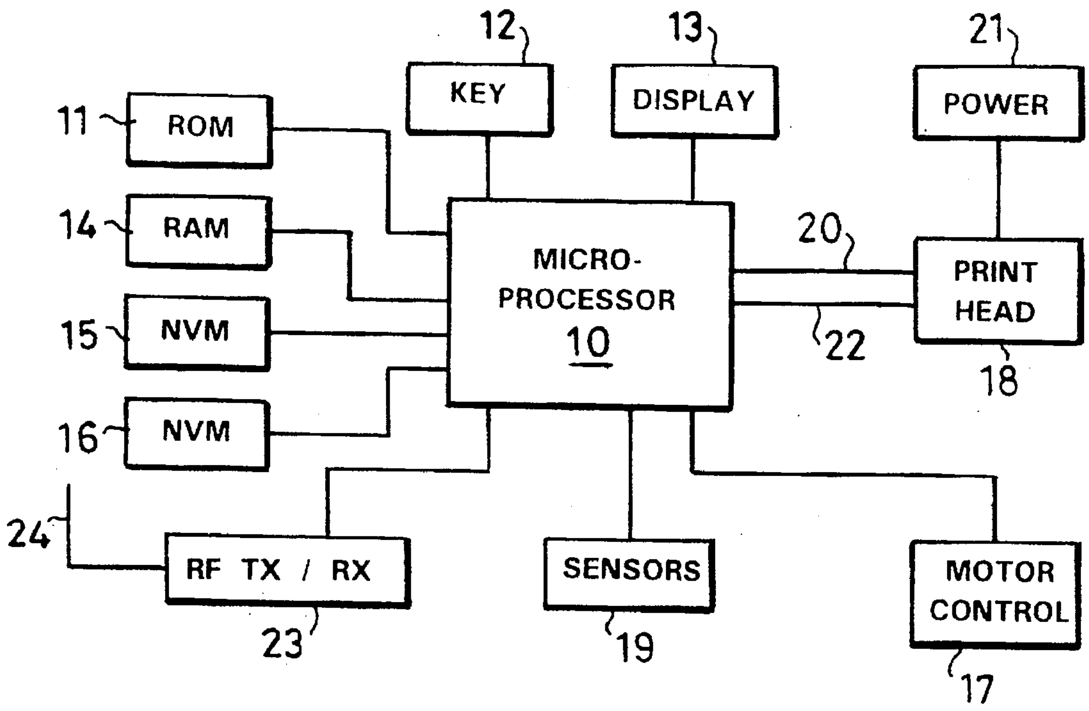
FIG. 1 is a block circuit diagram of a franking machine in accordance with the invention.

Referring first to FIG. 1, the franking machine includes a micro-processor 10 operating under program routines stored in a read only memory (ROM) 11. A keyboard 12 is provided for input of data by a user and a display 13 is provided to enable display of information to the user. A random access memory (RAM) 14 acts as a working store for storage of temporary data during operation of the franking machine. Non-volatile duplicated memories 15, 16 store data which is required to be retained even when the franking machine is not powered. Accounting data relating to use of the franking machine for printing franking representing postage charges for mail items and any other critical data to be retained is stored in the non-volatile memories 15, 16. A motor controller 17 is controlled by the microprocessor to control operation of motors for driving means (not shown) for feeding mail items past a thermal print head 18 and for winding a thermal transfer ink ribbon onto a take-up spool. Sensors 19 are provided to sense and monitor feeding of the mail item and of the ink ribbon. The sensors provide signals to the microprocessor to enable the microprocessor to control operation of the machine. For example a sensor is provided to indicate the speed of feeding of the mail item along the feed bed to enable the microprocessor to control speed of drive of a motor driving the impression roller such that the feed speed is maintained substantially constant. As the mail item is fed past the thermal printing elements of the print head, the microprocessor outputs, on line 20, to the print head in each of a plurality of printing cycles signals selecting those ones of the printing elements which are to be energised in the respective cycle. A pulse of electrical power is supplied to the selected thermal printing elements from a power source 21 when a strobe signal, on line 22, is supplied by the microprocessor. As is well known those parts of the franking machine concerned with carrying out accounting and control functions in relation to franking of mail items are housed in a secure housing to prevent unauthorised access thereto. The general construction and operation of franking machines is well known and accordingly it is believed to be unnecessary to describe the franking machine in further detail. It will be appreciated that although the franking machine is described hereinbefore as having a thermal print head, other means, well known in the franking machine art, of printing a franking impression may be provided and for example the franking impression may be printed by means of print elements carried on a rotatable print drum.

Figure 2:
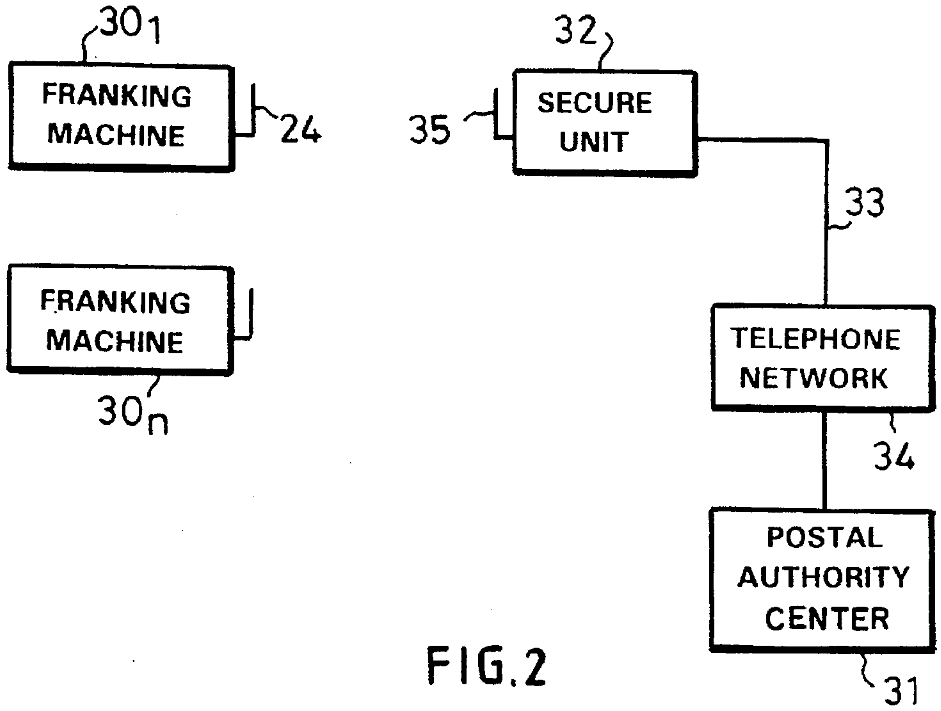
FIG. 2 illustrates a system for enabling a postal authority to monitor and control use of a franking machine.

In order to enable the postal authority to exert some control over use of the franking machine, a form of dongle is Used by providing a communication link between a transmitter/receiver 23 in the franking machine $30_1$ and a postal authority center 31 (see FIG. 2). It is preferred that the communication be effected by means of radio frequency transmission between the franking machine $30_1$ and a secure unit 32 installed in or near the user's premises. The transmitter/receiver 23 is connected to an antenna 24 and secure unit is provided with an antenna 35. The secure unit 32 may have the form of a secure safe like housing secured to a wall of the users premises and be connected to a telephone line 33 whereby communication with the secure unit may be effected by means of the telephone network 34. When there is only one franking machine $30_1$ in an area, a separate secure unit 32 is provided for each franking machine to be linked with the postal authority center. However when a number of franking machines $30_1 \ldots 30_n$ are located in a user's premises a single secure unit may communicate with all of those franking machines. Also when franking machines used by different user's are located in an area of such size that radio communication may be obtained with each of those franking machines a single secure unit disposed at a central location of that area may suffice to enable communication between all of those franking machines and the postal authority center.

Operation of each franking machine is dependent upon a predetermined communication between the franking machine and the secure unit. The predetermined communication may comprise reception, by the franking machine of a predetermined signal from the secure unit. The communication may be substantially continuous or may be at predetermined time periods. For example the secure unit may transmit continuously and the franking machine may be operated such that during each franking operation, prior to accounting for a postage charge for an item and prior to printing a franking impression on the item, the microprocessor of the franking machine carries out a check to determine that the predetermined signal transmitted by the secure unit is being received. If the predetermined signal is being received the microprocessor continues with the franking operation otherwise if the predetermined signal is not received the microprocessor is inhibited from continuing the franking operation. The microprocessor may be programmed to permit a limited number of attempts to carry out franking operations and if the predetermined signal is not received in that limited number of attempts the franking machine is locked and operation thereof remains inhibited until reset by an authorised service engineer. Instead of checking for receipt of the predetermined signal in each franking operation, the franking machine may be operated to carry out this check during a power up routine, failure to receive the signal inhibiting completion of the power up routine.

Preferably the predetermined signal transmitted by the secure unit comprises or includes an encrypted data message such that even if the radio transmission is intercepted and monitored the messages could not easily be decoded and therefore it would be difficult to attempt to emulate the predetermined signal. Additional security may be provided by changing the encrypted data message at intervals, the changing of the encrypted data message being effected for example each day. Alternatively if the communication between the secure unit and the franking machine includes transmission of messages from the franking machine to the secure unit, the changing of the encrypted data message may be effected as a function of data generated in the franking machine, for example items count.

Instead of transmitting the predetermined signal continuously, the signal may be transmitted for predetermined periods only and the franking machine is operated to check receipt of the signal only during each predetermined period.

The communication between the secure unit and the franking machine may comprise merely a transmission of a predetermined signal from the secure unit continuously or in predetermined periods as described hereinbefore. However a more complex mode of communication may be employed in which at least one transmission from the secure unit to the franking machine and from the franking machine to the secure unit is required. Transmission of the predetermined signal by the secure unit may be initiated by a transmission of a signal from the franking machine.

If desired the secure unit may be provided with a lock operated switch whereby operation of the secure unit to transmit the predetermined signal may be inhibited by a user of the franking machine. Thus the user could inhibit operation of the franking machine when the user is absent from the premises to prevent any use of the franking machine which is not authorised by the user. Also if desired the secure unit may be provided with means to inhibit operation of the secure unit to transmit the predetermined signal after elapse of a predetermined time whereby the franking machine may be used for that predetermined time and is then inhibited from further operation until the secure unit is reset by an authorised service engineer. Alternatively, with the secure unit connected to the postal authority center by the telephone network, the postal authority may reset the secure unit remotely to permit further use of the franking machine for a further predetermined time.

With the secure unit in communication with the postal authority center, the postal authority may send at any desired time a signal to the secure unit inhibiting further operation of the franking machine.

It will be understood that, unless the franking machine receives the predetermined signal from the secure unit, the franking machine is non-operational and cannot be used to dispense postage value in franking mail items. Accordingly if the franking machine is removed from the vicinity in which the predetermined signal can be received the franking machine cannot be used. Preferably the predetermined signal is different for each franking machine thereby preventing use of the franking machine in another location in the vicinity of another secure unit. If desired, the franking machine may be required to transmit a signal in response to receipt of the predetermined signal whereby the secure unit is aware that the franking machine is in the correct authorised location. The secure unit may be operated if no acknowledgement signal is received thereby to send a message via the telephone network to the postal authority indicating that the franking machine is not at the authorised location.

While communication between the franking machine and the secure unit has been described hereinbefore as being effected by means of a radio frequency link, it will be appreciated that other wireless communication may be used, for example infra-red. Radio frequency or infra-red communication may be effected without breach of the secure housing of the franking machine or of the secure unit.

I claim:

1. A franking machine system including:

signal generation means; and a franking machine;

said franking machine including signal receiving means;

electronic accounting and control means responsive to said signal receiving means;

printing means operable by said electronic accounting and control means to print on a mail item; and signal receiving means;

said signal generation means generating and continuously transmitting by wireless communication a predetermined signal during a period of time and said receiving means being operative to receive said predetermined signal transmitted by said signal generation means when said franking machine is located within a predetermined location relative to said signal generation means;

said electronic accounting and control means being operable to initiate a franking operation and operable to complete said franking operation only during said period of time and if said predetermined signal is received by said receiving means to perform a franking operation in which said electronic accounting and control means carries out accounting functions in respect of a postage charge for a mail item and operates said printing means to print on the mail item.

2. A franking machine system as claimed in claim 1 wherein the predetermined signal transmitted by the signal generation means includes an encrypted data message.

3. A franking machine system as claimed in claim 1 wherein the franking machine includes transmitter means operable to transmit a machine signal and the signal generation means is initiated to transmit the predetermined signal in response to receipt of said machine signal from said franking machine.

4. A franking machine system including:

signal generation means; and a franking machine;

said franking machine including signal receiving means;

electronic accounting and control means responsive to said signal receiving means;

printing means operable by said electronic accounting and control means to print on a mail item; and signal receiving means;

said signal generation means generating and continuously transmitting by wireless communication a predetermined signal during a period of time and said receiving means being operative to receive said predetermined signal transmitted by said signal generation means when said franking machine is located within a predetermined location relative to said signal generation means;

said electronic accounting and control means being operative in a power up routine carried out during said period of time to check that said predetermined signal is being received by said receiving means and Raid electronic accounting and control means being operative in response to receipt of said predetermined signal by said receiving means to complete said power up routine and being operable thereafter to perform franking operations in which said electronic accounting and control means carries out accounting functions in respect of postage charges for mail items and operates said printing means to print on the mail items.

5. A franking machine system as claimed in claim 4 wherein the predetermined signal transmitted by the signal generation means includes an encrypted data message.

6. A franking machine system as claimed in claim 4 wherein the franking machine includes transmitter means operable to transmit a machine signal and the signal generation means is initiated to transmit the predetermined signal in response to receipt of said machine signal from said franking machine.

7. A franking machine system including:

signal generation means; and a franking machine;

said franking machine including signal receiving means;

electronic accounting and control means responsive to said signal receiving means;

printing means operable by said electronic accounting and control means to print on a mail item; and signal receiving means;

said signal generation means generating and continuously transmitting by wireless communication a predetermined signal during a period of time and said receiving means being operative to receive said predetermined signal transmitted by said signal generation means when said franking machine is located within a predetermined location relative to said signal generation means;

said electronic accounting and control means being operable to initiate a franking operation in respect of a mail item and to carry out a check to determine that the predetermined signal is being received by said receiving means and only if said predetermined signal is being received by said receiving means to complete said franking operation by carrying out accounting functions in respect of a postage charge for the mail item and operating said printing means to print on the mail item whereby said franking machine is operable to perform franking operations only when said predetermined signal is transmitted during said period of time and only when said predetermined signal is being received by said receiving means.

8. A franking machine system as claimed in claim 7 wherein the electronic accounting and control means is inhibited from completion of a first franking operation and performing further franking operations after initiation of the first franking operation and the check in the first franking operation determines that the predetermined signal is not being received.

9. A franking machine system as claimed in claim 7 wherein the predetermined signal transmitted by the signal generation means includes an encrypted data message.

10. A franking machine system as claimed in claim 7 wherein the franking machine includes transmitter means operable to transmit a machine signal and the signal generation means is initiated to transmit the predetermined signal in response to receipt of said machine signal from said franking machine.

11. A franking machine system including:

signal generation means; and a franking machine;

said franking machine including signal receiving means;

electronic accounting and control means responsive to said signal receiving means;

printing means operable by said electronic accounting and control means to print on a mail item; and signal receiving means;

said signal generation means generating and continuously transmitting by wireless communication a predetermined signal during a period of time and said receiving means being operative to receive said predetermined signal transmitted by said signal generation means when said franking machine is located within a predetermined location relative to said signal generation means;

said electronic accounting and control means being operable during said period of time to initiate a first franking operation in respect of a first mail item and to carry out a check to determine that the predetermined signal is being received by said receiving means and only if said predetermined signal is being received by said receiving means to complete said first franking operation by carrying out accounting functions in respect of a postage charge for the first mail item and operating said printing means print on the first mail and said electronic accounting and control means further being operable during said period of time to initiate a second franking operation in respect of a second mail item and to carry out the check to determine that the predetermined signal is being received by said receiving means and only if said predetermined signal is being received by said receiving means to complete said second franking operation by carrying out accounting functions in respect of a postage charge for the second mail item and operating said printing means to print on the second mail whereby said franking machine is operable to perform franking operations only when said predetermined signal is transmitted during said period of time and only when said predetermined signal is being received by said receiving means.

12. A franking machine system as claimed in claim 11 wherein the predetermined signal transmitted by the signal generation means includes an encrypted data message.

13. A franking machine system as claimed in claim 11 wherein the franking machine includes transmitter means operable to transmit a machine signal and the signal generation means is initiated to transmit the predetermined signal in response to receipt of said machine signal from said franking machine.

* * * * *